United States Patent
Li et al.

(10) Patent No.: US 11,974,272 B2
(45) Date of Patent: Apr. 30, 2024

(54) APPARATUS AND METHOD FOR UTILIZING UPLINK RESOURCES

(71) Applicant: Nokia Technologies Oy, Espoo (FI)

(72) Inventors: Haitao Li, Beijing (CN); Srinivasan Selvaganapathy, Bangalore (IN)

(73) Assignee: NOKIA TECHNOLOGIES OY, Espoo (FI)

( * ) Notice: Subject to any disclaimer, the term of this patent is extended or adjusted under 35 U.S.C. 154(b) by 413 days.

(21) Appl. No.: 17/289,202

(22) PCT Filed: Dec. 18, 2018

(86) PCT No.: PCT/CN2018/121840
§ 371 (c)(1),
(2) Date: Apr. 27, 2021

(87) PCT Pub. No.: WO2020/124385
PCT Pub. Date: Jun. 25, 2020

(65) Prior Publication Data
US 2021/0345372 A1    Nov. 4, 2021

(51) Int. Cl.
*H04W 72/20*    (2023.01)
*H04W 72/1268*    (2023.01)

(52) U.S. Cl.
CPC ....... *H04W 72/1268* (2013.01); *H04W 72/20* (2023.01)

(58) Field of Classification Search
CPC ..... H04W 92/20; H04W 16/00; H04W 48/20; H04W 72/20; H04W 72/23; H04W 72/27;
(Continued)

(56) References Cited

U.S. PATENT DOCUMENTS

| 2018/0124790 A1 | 5/2018 | Yerramalli | |
|---|---|---|---|
| 2021/0352691 A1* | 11/2021 | Li | H04W 72/21 |
| 2022/0232659 A1* | 7/2022 | Kim | H04W 72/23 |

FOREIGN PATENT DOCUMENTS

| CN | 101627649 A | 1/2010 |
|---|---|---|
| CN | 102656919 A | 9/2012 |

(Continued)

OTHER PUBLICATIONS

International Search Report and Written Opinion received for corresponding Patent Cooperation Treaty Application No. PCT/CN2018/121840, dated Jun. 27, 2019, 9 pages.

(Continued)

*Primary Examiner* — Sulaiman Nooristany
(74) *Attorney, Agent, or Firm* — Lippes Mathias LLP (57) ABSTRACT

An apparatus and method for data transmission are presented. The method in a base station comprises broadcasting (200) information on one or more neighboring cells supporting preconfigured uplink resources and information on request types supported by the one or more cells; receiving (202) a user terminal which performs a cell reselection to the base station; receiving (204) from a user terminal a request to utilize dedicated preconfigured uplink resources, the request comprising Physical Cell Identity of the previous base station with which the user terminal utilized dedicated preconfigured uplink resources prior camping on the base station and the User Equipment Identification of the user terminal in the previous base station; transmitting (206) to the previous base station a message requesting configuration data related to dedicated preconfigured uplink resources of the user terminal and an indication that the previous base station may release the resources; receiving (208) from the previous base station the configuration data; and restoring (Continued)

(210) dedicated preconfigured uplink resources for the user terminal.

6 Claims, 4 Drawing Sheets

(58) Field of Classification Search
CPC . H04W 72/29; H04W 72/30; H04W 72/1268; H04W 48/12
See application file for complete search history.

(56) References Cited

FOREIGN PATENT DOCUMENTS

| WO | 2012/131654 A1 | 10/2012 |
|---|---|---|
| WO | 2017/193945 A1 | 11/2017 |

OTHER PUBLICATIONS

"UL Transmission in Preconfigured Resource", 3GPP TSG RAN WG1 Meeting #94, R1-1808118, Agenda : 6.2.1.2, Huawei, Aug. 20-24, 2018, 5 pages.

"Transmission in Preconfigured UL Resources", 3GPP TSG RAN WG1 Meeting #94, R1-1808431, Agenda : 6.2.1.2, Nokia, Aug. 20-24, 2018, 4 pages.

"Transmission in Preconfigured UL Resources", 3GPP TSG RAN WG1 Meeting #95, R1-1812904, Agenda : 6.2.1.2, Nokia, Nov. 12-16, 2018, 5 pages.

Extended European Search Report received for corresponding European Patent Application No. 18943487.1, dated Jun. 1, 2022, 5 pages.

"Uplink transmission in dedicated pre-configured resource", 3GPP TSG-RAN WG2 Meeting #104, R2-1816401, Agenda : 12.2.4, Huawei, Nov. 12-16, 2018, 5 pages.

"Discussion on preconfigured UL resources in NB-IoT", 3GPP TSG RAN WG1 Meeting #95, R1-1812536, Agenda : 6.2.2.2, LG Electronics, Nov. 12-16, 2018, 9 pages.

"Further topics for transmission in preconfigured UL resources", 3GPP TSG RAN WG1 Meeting #95, R1-1813762, Agenda : 6.2.2.2, Huawei, Nov. 12-16, 2018, 14 pages.

Office action received for corresponding Chinese Patent Application No. 201880100244.3, dated Aug. 3, 2023, 6 pages of office action and no page of translation available.

"UL Transmission in Preconfigured Resource", 3GPP TSG RAN WG1 Meeting #94bis, R1-1810089, Agenda: 6.2.1.2, Huawei, Oct. 8-12, 2018, 6 pages.

"UL Transmission in Preconfigured Resource", 3GPP TSG RAN WG1 Meeting #95, R1-1812142, Agenda: 6.2.1.2, Huawei, Nov. 12-16, 2018, 8 pages.

* cited by examiner

APPARATUS AND METHOD FOR UTILIZING UPLINK RESOURCES

RELATED APPLICATION

This application was originally filed as PCT Application No. PCT/CN2018/121840 on Dec. 18, 2018, each of which is incorporated herein by reference in its entirety.

TECHNICAL FIELD

The exemplary and non-limiting embodiments of the invention relate generally to communications.

BACKGROUND

The following description of background art may include insights, discoveries, understandings or disclosures, or associations together with disclosures not known to the relevant art prior to the present invention but provided by the invention. Some of such contributions of the invention may be specifically pointed out below, whereas other such contributions of the invention will be apparent from their context.

In communication systems, connections between communicating parties have traditionally been single connections, where a communication resource has been allocated for a call or a data connection. When a resource has been reserved for a user terminal, the terminal has been said to be in connected state. After the communication when the resource has been released, the user terminal is in idle state. Regarding data traffic this kind of procedure is suitable when the data transfer is continuous for a period of time or when there is relatively large amount of data to be transferred. However, when the amount of data to be transferred is small and there is no need for continuous data connection the procedure is cumbersome as it takes a considerable amount of signaling to set up. It may even be the case that the signaling involved takes more resources than the actual data traffic.

One proposed solution for uplink small data transmission is support of transmission over preconfigured uplink resources (PUR) for user terminals in idle mode or connected mode.

BRIEF DESCRIPTION

According to an aspect of the present invention, there are provided base station apparatuses of claims 1 and 7.

According to an aspect of the present invention, there is provided a user terminal apparatus of claim 8.

According to an aspect of the present invention, there are provided methods of claims 14, 18 and 19.

According to an aspect of the present invention, there are provided computer program instructions of claims 23, 24 and 25.

One or more examples of implementations are set forth in more detail in the accompanying drawings and the description below. Other features will be apparent from the description and drawings, and from the claims.

BRIEF DESCRIPTION OF THE DRAWINGS

In the following the invention will be described in greater detail by means of preferred embodiments with reference to the accompanying drawings, in which.

DETAILED DESCRIPTION OF SOME EMBODIMENTS

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
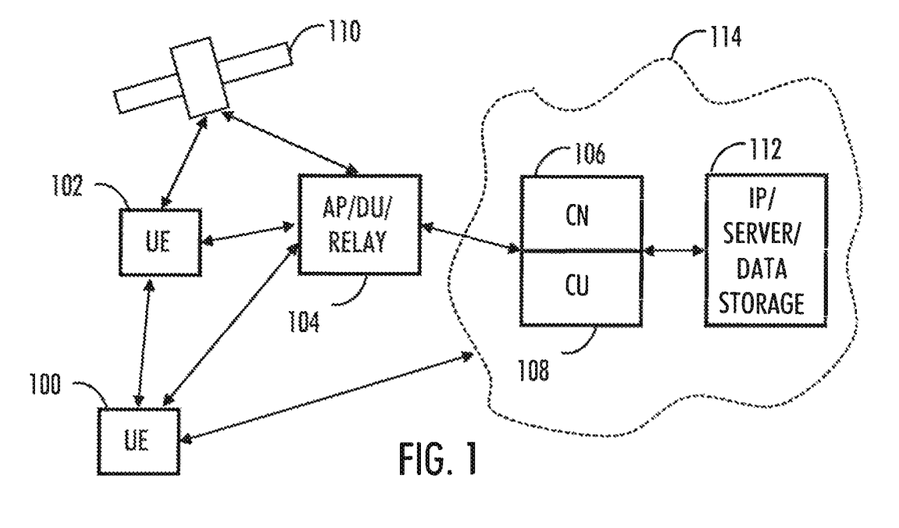
FIG. 1 illustrates a general architecture of an exemplary communication system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for data and signaling purposes. The (e/g)NodeB is a computing device configured to control the radio resources of communication system it is coupled to. The (e/g)NodeB may also be referred to as a base station, an access point or any other type of interfacing device including a relay station capable of operating in a wireless environment. The (e/g) NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 106 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. One technology in the above network may be denoted as narrowband Internet of Things (NB-Iot). The user device may also be a device having capability to operate utilizing enhanced machine-type communication (eMTC). The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented. 5G enables using multiple input-multiple output (MIMO) antennas, perhaps more base stations or nodes than the LTE (a so-called small cell concept), including macro sites operating in co-operation with smaller stations and employing a variety of radio technologies depending on service needs, use cases and/or spectrum available. 5G mobile communications support a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz, above 6 GHz-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and mobile edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

In an embodiment, 5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 110 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure. For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

As mentioned, radio access network may be split into two logical entities called Central Unit (CU) and Distributed Unit (DU). In prior art, both CU and DU supplied by the same vendor. Thus they are designed together and interworking between the units is easy. The interface between CU and DU is currently being standardized by 3GPP and it is denoted F1 interface. Therefore in the future the network operators may have the flexibility to choose different vendors for CU and DU. Different vendors can provide different failure and recovery characteristics for the units. If the failure and recovery scenarios of the units are not handled in a coordinated manner, it will result in inconsistent states in the CU and DU (which may lead to subsequent call failures, for example). Thus there is a need to enable the CU and DU from different vendors to coordinate operation to handle failure conditions and recovery, taking into account the potential differences in resiliency capabilities between the CU and DU.

There may be situations where user terminal and communication network may transmit relatively small amounts of data to each other. Traditionally, if Core Network or Mobile Management Entity MME of the Core Network needs to send small downlink data to user terminal after paging or the user terminal needs to send some data to the network, the data can be sent only after a Radio Resource Control RRC connection has been set up between the user terminal and the base station the terminal is connected to. Usually this RRC connection setup is complete after a so called Msg5 (RRC connection setup complete message) has been transmitted. This procedure contains significant signaling overhead compared to the amount of data to be transmitted. This problem is expected to be significant as new machine type communication, MTC, solutions are developed. For example, narrowband Internet-of-Things, NB-IoT, is widely studied and the number of apparatuses communicating over Internet is expected to rise drastically.

To reduce the signaling overhead so called connectionless small data transmission is proposed. One proposed solution for uplink small data transmission is support of transmission over preconfigured uplink resources (PUR) for user terminals having valid timing advance in idle mode or connected mode. There are three modes for PUR: Dedicated PURs without any collisions/contention, shared PURs without any contention and shared PURs with the possibility of collisions and therefore contention.

For dedicated PURs, once they are configured to a given user terminal, they cannot be used by other user terminal. Therefore, unlike shared PURs that can be shared among user terminals, dedicated PURs should be carefully configured and managed to avoid the resource waste, considering limited radio resources and the large amount of communicating devices.

Figure 2:
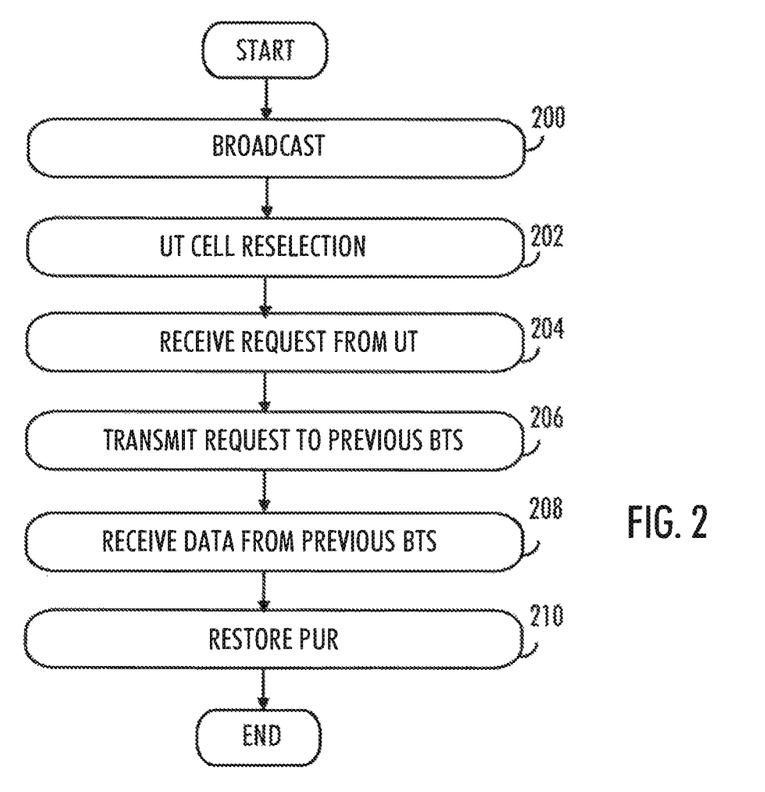
FIGS. 2, 3, 4, 5 and 6 are charts illustrating embodiments of the invention.
Figure 3:
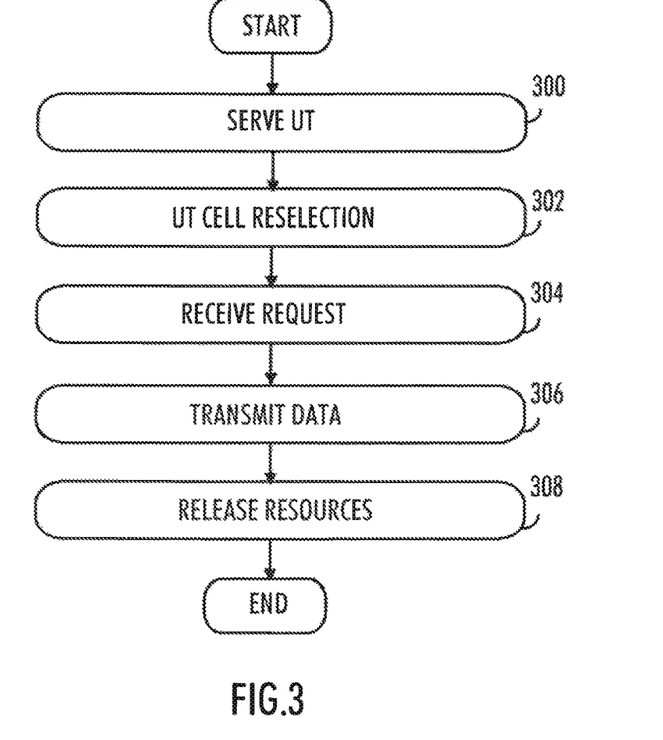

FIGS. 2 and 3 are flowcharts illustrating some embodiments. The figures illustrate examples of the operation of an apparatus or a network element such as base station (gNB) or a part of a base station, the apparatus being configured to communicate with a user terminal.

In this example, a user terminal is camped on a base station. It may be in an idle mode. It utilises dedicated preconfigured uplink resources to transmit data to the base station. Due to mobility issues it may, during the described process, move to being served by another base station. FIG. 2 illustrates an example of the operation of the base station receiving the user terminal.

In step 200, the apparatus is configured to broadcast information on one or more neighboring cells supporting preconfigured uplink resources and information on request types supported by the one or more cells.

The base station may broadcast information for enabling dedicated PUR release for neighboring cells. In an embodiment, the information may include a list of neighboring cells for which PUR release can be requested. The information may further comprise an indication whether release can be requested in Msg3 (RRC Connection Request) or Msg5 (RRC connection setup complete message) or after Msg5 or in preconfigured uplink resources.

The information may further comprise an indication whether release is allowed to trigger RRC connection setup procedure or Early Data Transmission, EDT, procedure in idle mode. Optionally the triggering may be based on a given threshold on the dedicated PUR used/unused ratio or number of unused PUR occasions. The amount of allocated PUR resources may be adjusted.

In step 202, the apparatus is configured to receive a user terminal which performs a cell reselection to the base station.

In step 204, the apparatus is configured to receive from the user terminal a request to utilize dedicated preconfigured uplink resources, the request comprising Physical Cell Identity of the previous base station with which the user terminal utilized dedicated preconfigured uplink resources prior camping on the base station and the User Equipment Identification of the user terminal used by the previous base station.

In an embodiment, the user terminal determines how to request the PUR release from the serving cell based on network configuration. In an embodiment, the request may be sent utilizing a normally triggered connection setup/EDT procedure, including the release request in Msg3 or Msg5 or after Msg5. In an embodiment, the request may be sent utilizing shared PURs, if shared PURs are configured in the new base station. In an embodiment, an RRC connection setup/EDT procedure may be triggered for the release request. Optionally the triggering may be based on a given threshold on the dedicated PUR used/unused ratio or number of unused PUR occasions. The amount of allocated PUR resources may be adjusted.

In step 206, the apparatus is configured to transmit to the previous base station a message requesting configuration data related to dedicated preconfigured uplink resources of the user terminal and an indication that the previous base station may release the resources. This confirms that the resources will be available for some other user terminal connected to the previous base station.

In step 208, the apparatus is configured to receive from the previous base station the configuration data.

In step 210, the apparatus is configured to restore dedicated preconfigured uplink resources for the user terminal.

FIG. 3 illustrates an example of the operation of the base station from which the user terminal moves to under another base station.

In step 300, the apparatus is configured to serve a user terminal by providing dedicated preconfigured uplink resources for the user terminal.

In step 302, the apparatus is configured to release the user terminal which performs a cell reselection to another base station serving the neighboring cell. This may happen due to mobility of the user terminal, for example.

In step 304, the apparatus is configured to receive from the another base station serving the neighboring cell a message requesting configuration data related to dedicated preconfigured uplink resources of the user terminal and an indication that the base station apparatus may release the resources. In an embodiment, the request may comprise the User Equipment Identification of the user terminal used by the base station.

In step 306, the apparatus is configured to transmit to the another base station serving the neighboring cell as a response to the request the configuration data; and In step 308, the apparatus is configured to release the dedicated preconfigured uplink resources used by the user terminal that made the cell reselection. Thus the resources will be available for some other user terminal connected to the base station.

Figure 4:
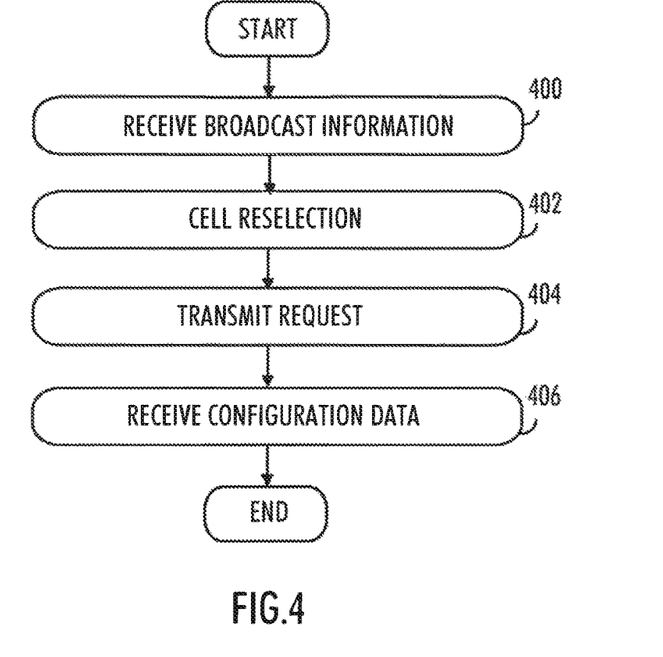

FIG. 4 is a flowchart illustrating an embodiment of the invention. FIG. 4 illustrates an example of the operation of an apparatus such as a user terminal or a part of a user terminal, the apparatus being configured to communicate with a base station utilizing preconfigured uplink resources.

In step 400, the user terminal apparatus is configured to receive from serving base station broadcast information on one or more neighboring cells supporting preconfigured uplink resources and information on request types supported by the one or more cells.

In step 402, the user terminal apparatus is configured to perform a cell reselection to a base station serving a neighboring cell. This may happen due to mobility of the user terminal, for example.

In step 404, the user terminal apparatus is configured to transmit to the base station the cell reselection was made to a request to utilize dedicated preconfigured uplink resources, the request comprising Physical Cell Identity of the previous base station with which the user terminal utilized dedicated preconfigured uplink resources and the User Equipment Identification of the user terminal in the previous base station.

In an embodiment, the request is transmitted utilising on shared preconfigured uplink resources.

In an embodiment, the request is transmitted as Early Data Transmission.

In an embodiment, the request is transmitted as a Radio Resource Connection set up request.

In step 406, the apparatus is configured to receive from the base station the cell reselection was made to configuration data related to restored dedicated preconfigured uplink resources.

Figure 5:
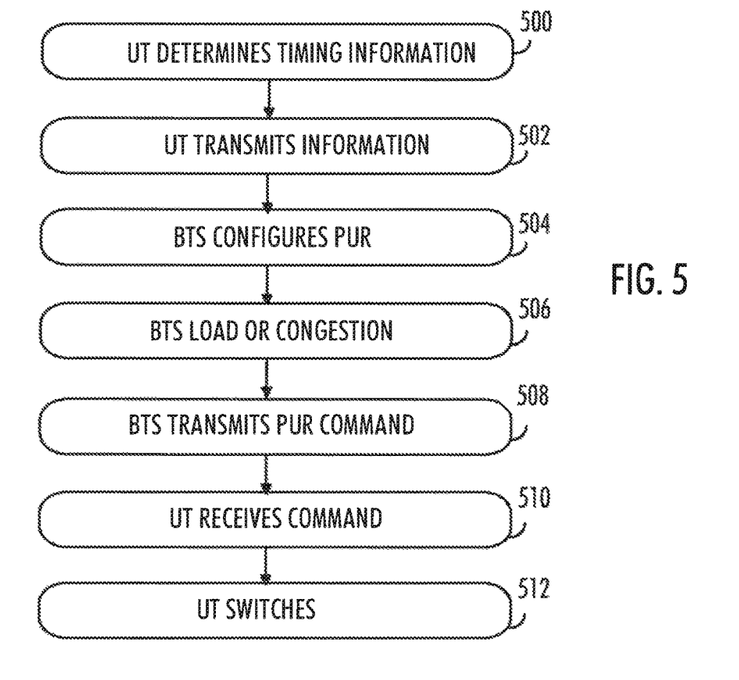

FIG. 5 is a flowchart illustrating an embodiment of the invention. FIG. 5 illustrates an example of the operation of an apparatus such as a user terminal or a part of a user terminal, and a base station or a part of a base station.

If an idle mode stationary user terminal is in the coverage of more than one cells, the preconfigured resource for uplink transmission can be further enhanced as follows.

In step 500, the user terminal apparatus is configured to determine timing advance of base stations serving neighboring cells. The determination of timing advance may be based on current cell timing advance and the Observed Time Difference, OTD, measurements performed by the user terminal.

In step 502, the user terminal apparatus is configured to transmit information on identity of the base stations serving neighboring cells to the base station the user terminal is connected to.

In an embodiment, the user terminal may transmit the information as part of a RRC connection setup to establish the preconfigured uplink resources. The information may thus comprise potential neighbors where the base station can redirect the user terminal to switch the PUR transmission in case if the source base station is in need to release PUR resources.

In step 504, the base station apparatus configures the PUR with additional indication that later switching is possible for set of neighbor cells. The neighbor cells are selected from the PUR candidate cells reported by the user terminal.

In step 506, the base station apparatus determines that there is a need for capacity in the cell served by the base station. There may be a large load or congestion at the serving cell.

In step 508, the base station apparatus transmits a preconfigured uplink resource switching command to the user terminal, the command identifying the base station to be switched to and time instant of the switching. In an embodiment, the time instant is indicated by a System Frame Number, SFN, when the PUR resources will be active in the new cell.

In step 510, the user terminal apparatus is configured to receive from the base station the user terminal is connected to a preconfigured uplink resource switching command with the time instant of the switching.

In step 512, the user terminal apparatus is configured to switch to utilize the preconfigured uplink resources at the given time instant. Thus, the user terminal does not need to perform a random access procedure in the new cell.

In an embodiment, user terminal in idle mode can report the neighbor cell which is becoming better in one of PUR transmission and the serving base station can decide to switch based on the same via PUR switching command.

Figure 6:
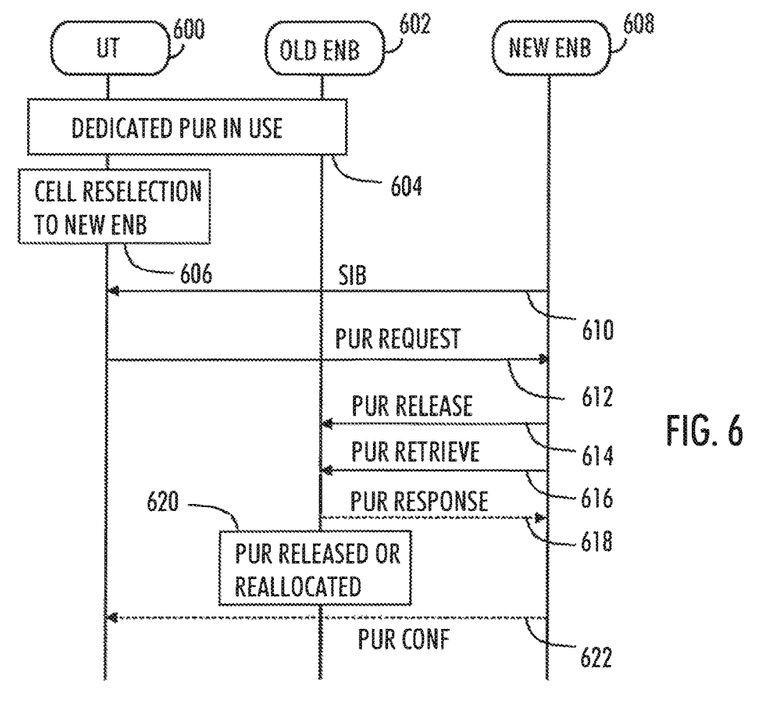

FIG. 6 is a signaling chart illustrating an embodiment. The figure illustrate example of the operation of a network element such as base station (gNB) or a part of a base station, and a user terminal or a part of the user terminal.

The user terminal 600 is connected to base station 602 and utilizing 604 dedicated preconfigured uplink resources.

The user terminal then performs a cell reselection 606 to a neighboring base station 608. The user terminal receives System Information Block, SIB, broadcast 610 from the new base station 608. The SIB transmission may comprise PUR related information, such as PUR release enabling indication and unused PURs threshold, for example.

The user terminal 600 transmits to the new base station 608 a request 612 to utilize dedicated preconfigured uplink resources, the request comprising Physical Cell Identity of the previous base station 602 with which the user terminal utilized dedicated preconfigured uplink resources and the User Equipment Identification of the user terminal in the previous base station.

The new base station transmits a PUR release request 614 to the old base station 602. The request informs the old base station 602 that the user terminal will no longer utilize dedicated preconfigured uplink resources of the old base station and that they may be released.

The new base station 608 transmits a PUR retrieve request 614 to the old base station 602. The new base station requests configuration data of the dedicated preconfigured uplink resources the user terminal utilized.

The old base station 602 responds 616 with a message comprising the configuration data and releases 620 the resources or reallocates the resources to another user terminal.

The new base station 608 transmits configuration data of the dedicated preconfigured uplink resources to the user terminal 600 and the terminal may start utilizing the resources.

In NB-IoT, two different optimizations for the cellular internet of things, CIoT, in the evolved packet system, EPS, has been defined, namely User plane CIoT EPS optimization which resembles legacy LTE operation, and Control plane CIoT EPS optimization which enables support of efficient transport of user data over control plane via the Mobile Management Entity, MME, without triggering data radio bearer establishment. The former is denoted as UP solution and the latter as CO solution.

For UP solution, an extension to existing RETRIEVE UE CONTEXT RESPONSE message is proposed, the extension comprising new parameters related to PUR configurations, so that new base station can restore the PUR configuration in the old cell.

For CP solution, new X2 Application Protocol, X2AP, messages for PUR retrieval are proposed. In an embodiment, a new RETRIEVE PUR CONFIGURATION REQUEST message and RETRIEVE PUR CONFIGURATION RESPONSE message are proposed. Further, to enable the new base station to retrieve PUR configuration, in Uu interface signaling, RRCConnectionRequest-NB and RRCEarlyDataRequest-NB may to include the Physical Cell Identity, PCI, and Cell Radio Network Temporary Identifier, C-RNTI, information in the old cell.

An example of RRCEarlyDataRequest-NB message utilizing ASN.1 extension example is as follows:

```
-- ASN1START
RRCEarlyDataRequest-NB-r15 ::=      SEQUENCE {
    criticalExtensions              CHOICE {
        rrcEarlyDataRequest-r15         RRCEarlyDataRequest-NB-r15-IEs,
        criticalExtensionsFuture        SEQUENCE { }
    }
}
RRCEarlyDataRequest-NB-r15-IEs  ::= SEQUENCE {
    s-TMSI-r15                      S-TMSI,
    establishmentCause-r15          ENUMERATED {mo-Data-r15, mo-ExceptionData-r15,
                                    delayTolerantAccess-r15, spare1},
    cqi-NPDCCH-r15                  CQI-NPDCCH-NB-r14
    OPTIONAL,
    dedicatedInfoNAS-r15            DedicatedInfoNAS,
    rrcEarlyDataRequest-NB-r16-IEs      RRCEarlyDataRequest-NB-r16-IEs
        OPTIONAL
}
RRCEarlyDataRequest-NB-r16-IEs  ::= SEQUENCE {
    pur-ReleaseRequest-r16          PUR-ReleaseRequest-r16
    OPTIONAL,
    nonCriticalExtension            SEQUENCE { }
        OPTIONAL
}
PUR-ReleaseRequest-r16 ::= SEQUENCE {
    c-RNTI                          C-RNTI,
    physCellId                      PhysCellId,
}
-- ASN1STOP
```

Figure 7:
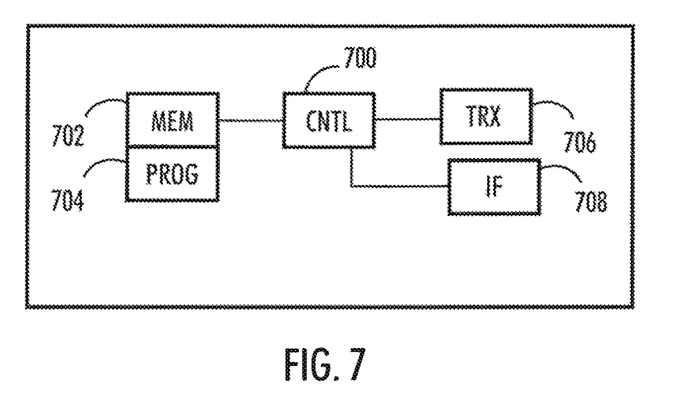
FIGS. 7, 8 and 9 illustrate simplified examples of apparatuses applying some embodiments of the invention.

FIG. 7 illustrates an embodiment. The figure illustrates a simplified example of an apparatus applying embodiments of the invention. In some embodiments, the apparatus may be a base station (gNB) or a part of a base station.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus of the example includes a control circuitry 700 configured to control at least part of the operation of the apparatus.

The apparatus may comprise a memory 702 for storing data. Furthermore the memory may store software 704 executable by the control circuitry 700. The memory may be integrated in the control circuitry.

The apparatus comprises a transceiver 706. The transceiver is operationally connected to the control circuitry 700. It may be connected to an antenna arrangement (not shown).

The apparatus may further comprise interface circuitry 708 configured to connect the apparatus to other devices and network elements of communication system, for example to other corresponding apparatuses and network elements, such as the Core Network. The interface may provide a wired or wireless connection to the communication network.

The software 704 may comprise a computer program comprising program code means adapted to cause the control circuitry 700 of the apparatus to broadcast information on one or more neighboring cells supporting preconfigured uplink resources and information on request types supported by the one or more cells; receive from a user terminal a request to utilize dedicated preconfigured uplink resources, the request comprising Physical Cell Identity of the previous base station with which the user terminal utilized dedicated preconfigured uplink resources prior camping on the base station and the User Equipment Identification of the user terminal in the previous base station; transmit to the previous base station a message requesting configuration data related to dedicated preconfigured uplink resources of the user terminal and an indication that the previous base station may release the resources receive from the previous base station the configuration data; and restore dedicated preconfigured uplink resources for the user terminal.

Figure 8:
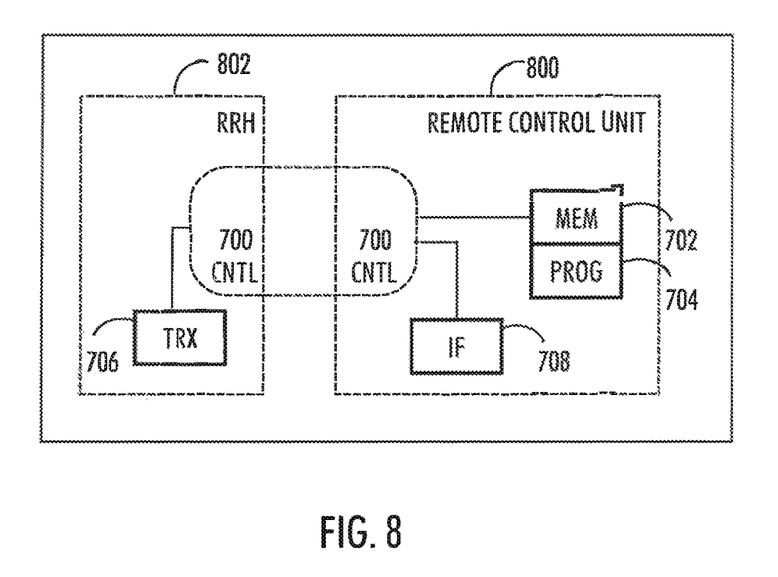

In an embodiment, as shown in FIG. 8, at least some of the functionalities of the apparatus of FIG. 7 may be shared between two physically separate devices, forming one operational entity. Therefore, the apparatus may be seen to depict the operational entity comprising one or more physically separate devices for executing at least some of the described processes. Thus, the apparatus of FIG. 8, utilizing such shared architecture, may comprise a remote control unit RCU 800, such as a host computer or a server computer, operatively coupled (e.g. via a wireless or wired network) to a remote radio head RRH 802 located in the base station. In an embodiment, at least some of the described processes may be performed by the RCU 800. In an embodiment, the execution of at least some of the described processes may be shared among the RRH 802 and the RCU 800.

In an embodiment, the RCU 800 may generate a virtual network through which the RCU 800 communicates with the RRH 802. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (e.g. to the RCU). External network virtualization is targeted to optimized network sharing. Another category is internal virtual networking which provides network-like functionality to the software containers on a single system. Virtual networking may also be used for testing the terminal device.

In an embodiment, the virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

Figure 9:
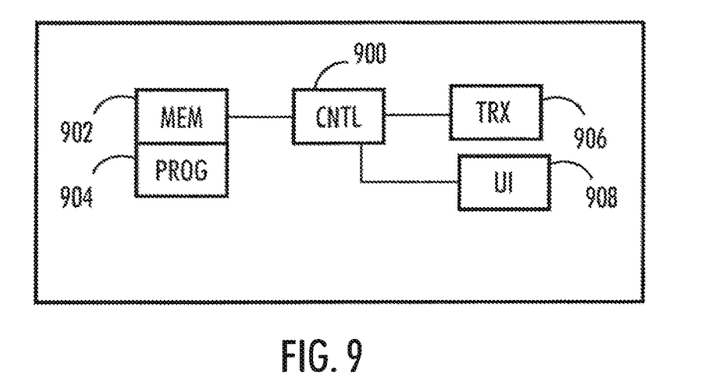

FIG. 9 illustrates an embodiment. The figure illustrates a simplified example of an apparatus applying embodiments of the invention. In some embodiments, the apparatus may be a user terminal or a part of a user terminal.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus of the example includes a control circuitry 900 configured to control at least part of the operation of the apparatus.

The apparatus may comprise a memory 902 for storing data. Furthermore the memory may store software 904 executable by the control circuitry 900. The memory may be integrated in the control circuitry.

The apparatus comprises a transceiver 906. The transceiver is operationally connected to the control circuitry 900. It may be connected to an antenna arrangement (not shown).

In an embodiment, the apparatus may further comprise user interface circuitry 908 configured to enable user of the apparatus to communicate with the apparatus. The user interface may comprise a microphone, a speaker, a display which may be touch sensitive, a keyboard (which may be realized with the touch sensitive display) and other devices known in the art. connect the apparatus to other devices and network elements of communication system, for example to other corresponding apparatuses and network elements, such as the Core Network. The interface may provide a wired or wireless connection to the communication network.

The software 604 may comprise a computer program comprising program code means adapted to cause the control circuitry 600 of the apparatus to control the apparatus to receive broadcast information on one or more neighboring cells supporting preconfigured uplink resources and information on request types supported by the one or more cells; perform a cell reselection to a base station serving a neighboring cell; transmit to the base station the cell reselection was made a request to utilize dedicated preconfigured uplink resources, the request comprising Physical Cell Identity of the previous base station with which the user terminal utilized dedicated preconfigured uplink resources and the User Equipment Identification of the user terminal in the previous base station; receive from the base station the cell reselection was made configuration data related to restored dedicated preconfigured uplink resources.

In an embodiment, the apparatus may comprise means for broadcasting information on one or more neighboring cells supporting preconfigured uplink resources and information on request types supported by the one or more cells; means for receiving from a user terminal a request to utilize dedicated preconfigured uplink resources, the request comprising Physical Cell Identity of the previous base station with which the user terminal utilized dedicated preconfigured uplink resources prior camping on the base station and the User Equipment Identification of the user terminal in the previous base station; means for transmitting to the previous base station a message requesting configuration data related to dedicated preconfigured uplink resources of the user terminal and an indication that the previous base station may release the resources, means for receiving from the previous base station the configuration data; and means for restoring dedicated preconfigured uplink resources for the user terminal.

In an embodiment, the apparatus may comprise means for serving a user terminal by providing dedicated preconfigured uplink resources for the user terminal; means for releasing the user terminal which performs a cell reselection to another base station serving the neighboring cell; means for receiving from the another base station serving the neighboring cell a message requesting configuration data related to dedicated preconfigured uplink resources of the user terminal and an indication that the base station apparatus may release the resources; and means for transmitting to the another base station serving the neighboring cell as a response to the request the configuration data; and means for releasing the resources.

In an embodiment, the apparatus may comprise means for receiving broadcast information on one or more neighboring cells supporting preconfigured uplink resources and information on request types supported by the one or more cells; means for performing a cell reselection to a base station serving a neighboring cell; means for transmitting to the base station the cell reselection was made a request to utilize dedicated preconfigured uplink resources, the request comprising Physical Cell Identity of the previous base station with which the user terminal utilized dedicated preconfigured uplink resources and the User Equipment Identification of the user terminal in the previous base station; and means for receiving from the base station the cell reselection was made configuration data related to restored dedicated preconfigured uplink resources.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, which may comprise a working memory (RAM), a central processing unit (CPU), and a system clock. The CPU may comprise a set of registers, an arithmetic logic unit, and a controller. The controller is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as the technology advances, the inventive concept can be implemented in various ways. The invention and its embodiments are not limited to the examples described above but may vary within the scope of the claims.

What is claimed is:

1. A base station apparatus in a communication system serving a cell, configured to communicate with a user terminal, the apparatus comprising:
   at least one processor; and
   at least one memory including computer program code,
   the at least one memory and the computer program code configured to, with the at least one processor, cause the apparatus at least to perform:

broadcast information on one or more neighboring cells supporting preconfigured uplink resources and information on request types supported by the one or more cells;

receive from a user terminal a request to utilize dedicated preconfigured uplink resources, the request comprising Physical Cell Identity of the previous base station with which the user terminal utilized dedicated preconfigured uplink resources prior camping on the base station and the User Equipment Identification of the user terminal in the previous base station;

transmit to the previous base station a message requesting configuration data related to dedicated preconfigured uplink resources of the user terminal and an indication that the previous base station may release the resources;

receive from the previous base station the configuration data; and restore dedicated preconfigured uplink resources for the user terminal.

2. The base station apparatus of claim 1, the at least one memory and the computer program code configured to, with the at least one processor, cause the apparatus further to perform:

receive the request to utilize dedicated preconfigured uplink resources on shared preconfigured uplink resources.

3. The base station apparatus of claim 1, the at least one memory and the computer program code configured to, with the at least one processor, cause the apparatus further to perform:

receive the request to utilize dedicated preconfigured uplink resources as Early Data Transmission from the user terminal.

4. The base station apparatus of claim 1, the at least one memory and the computer program code configured to, with the at least one processor, cause the apparatus further to perform:

receive from the user terminal identities of base stations serving neighboring cells, for which the user terminal is able to obtain timing advance information and which are suitable base stations for allocating preconfigured uplink resources for the user terminal.

5. The base station apparatus of claim 1, the at least one memory and the computer program code configured to, with the at least one processor, cause the apparatus further to perform:

configure the preconfigured uplink resources for the user terminal with an indication that the user terminal may be switched to another base station serving a neighboring cell reported by the user terminal.

6. The base station apparatus of claim 1, the at least one memory and the computer program code configured to, with the at least one processor, cause the apparatus further to perform:

determine that there is a need for capacity in the cell served by the base station; and transmit a preconfigured uplink resource switching command to the user terminal, the command identifying the base station to be switched to and time instant of the switching.

* * * * *